United States Patent
Wood (10) Patent No.: US 7,743,092 B2
(45) Date of Patent: Jun. 22, 2010

(54) METHOD FOR RECOGNIZING AND DISTRIBUTING MUSIC

(76) Inventor: Lawson A. Wood, 873 N. Frederick St., Arlington, VA (US) 22205

( * ) Notice: Subject to any disclaimer, the term of this patent is extended or adjusted under 35 U.S.C. 154(b) by 0 days.

(21) Appl. No.: 10/649,932

(22) Filed: Aug. 28, 2003

(65) Prior Publication Data

US 2004/0049540 A1    Mar. 11, 2004

Related U.S. Application Data

(63) Continuation-in-part of application No. 09/438,469, filed on Nov. 12, 1999, now abandoned.

(51) Int. Cl.
*G06F 15/16* (2006.01)
*G06F 21/00* (2006.01)
*G10H 7/00* (2006.01)
*G10L 17/00* (2006.01)

(52) U.S. Cl. .................... 709/203; 704/246; 705/51; 84/609

(58) Field of Classification Search ............. 705/27, 705/51–52; 84/609; 709/203
See application file for complete search history.

(56) References Cited

U.S. PATENT DOCUMENTS

| 5,734,719 A | 3/1998 | Tsevdos et al. |
| 5,745,556 A | 4/1998 | Ronen |
| 5,794,217 A | 8/1998 | Allen |
| 5,874,686 A | 2/1999 | Ghias et al. |
| 5,918,213 A | 6/1999 | Bernard et al. |
| 6,057,884 A | 5/2000 | Chen et al. |
| 6,282,549 B1 | 8/2001 | Hoffert et al. |
| 6,385,596 B1 | 5/2002 | Wiser et al. |

OTHER PUBLICATIONS

Rodger J. McNab et al., "The New Zealand Digital Library Melody Index," D-Lib Magazine (downloaded from the Internet) May 1997 (11 page printout).

Paul Flavin, web site entitled "Play a Piano/Synthesizer/Oscilloscope," http://www frontiernet.net/~imaging/play_a_piano.html, copyright date 1998, 2 pages.

*Primary Examiner*—Wen-Tai Lin (57) ABSTRACT

A customer for music distributed over the internet may select a composition from a menu of written identifiers (such as the song title and singer or group) and then confirm that the composition is indeed the one desired by listening to a corrupted version of the composition. If the customer has forgotten the song title or the singer or other words that provide the identifier, he or she may hum or otherwise vocalize a few bars of the desired composition, or pick the desired composition out on a simulated keyboard. A music-recognition system then locates candidates for the selected composition and displays identifiers for these candidates to the customer.

18 Claims, 7 Drawing Sheets

METHOD FOR RECOGNIZING AND DISTRIBUTING MUSIC

CROSS REFERENCE TO RELATED APPLICATION

This is a continuation-in-part of application Ser. No. 09/438,469, filed Nov. 12, 1999 now abandoned, the entire disclosure of which is incorporated herein by reference.

BACKGROUND OF THE INVENTION

The present application is directed to a method for recognizing and distributing music, and more particularly to a method for recognizing a musical composition from a specimen that is provided by a customer (as by humming, singing, or otherwise vocalizing the specimen or by picking it out on a simulated piano or other tone generator), and for permitting a customer to preview a musical composition before distributing the composition to the customer over the internet.

The internet (and particularly the worldwide web) is becoming an important vehicle for distributing music, usually in encoded form. Web sites currently (1999) exist that distribute music in an encoded format known as "MP3. " So-called "juke box" programs are also available which permit MP3 files that have been downloaded over the internet to be stored and played on audio systems. Some authorities speculate that distribution of music over the internet will eventually replace conventional record shops.

Some customers who desire to purchase a recording at a record shop may be familiar with the music itself, but may not be sure of the singer or group that produced the music, or possibly the title of the relevant song or album. In a music shop, such a customer is able to question a shopkeeper, and possibly hum a few bars of the musical composition for the shopkeeper to attempt to identify. Alternatively, music stores frequently permit patrons to sample recordings before buying them, so a customer who is not sure which recording he or she would like to purchase may select a few possible recordings and listen to them until the desired recording is located. There is no harm in permitting a customer to listen to as much of a recording as the customer would like, since the customer cannot legally take a recording from the shop without paying for it.

Speech recognition technology is highly developed. Typically, features are extracted from spoken words and then normalized to provide patterns that are compared to patterns in a pattern library. When a pattern derived from a spoken word matches a pattern in the library sufficiently, a phoneme of the spoken word has been found. The features that are extracted from the spoken words may identify a range of frequencies that are present during extremely brief slices of time and the power at those frequencies. Sophisticated mathematical operations are then performed on the extracted features in order to generate the patterns for pattern matching.

SUMMARY OF THE INVENTION

An object of the invention is to facilitate distribution of music over the internet by permitting customers or other people to preview (perhaps "pre-listen" would be more accurate, but Applicant prefers to stick with English words) music before downloading it.

Another object is to permit people to preview music in a manner that permits them to identify a musical composition for which they are searching without providing a usable substitute for the desired composition.

A further object is to provide techniques for corrupting music so that it can be used for purpose of identification but not enjoyment.

Yet another object is to provide a method for recognizing a musical composition that is hummed, sung, chanted, or otherwise vocalized by a customer. The specimen may be sent via the internet or telephone to a remote location for analysis and pattern matching. Alternatively, if a customer's home computer is suitably equipped, the home computer can be used to generate a pattern locally from the customer's specimen, and the pattern alone may be transmitted via the internet to a remote location for pattern matching. The music recognition can also be executed at record shops, without sending either the specimen of the customer's vocalization or a pattern derived from the specimen to a remote location.

An additional object of the invention is to permit a customer to generate a specimen for pattern matching by manipulating a keyboard, a simulated musical instrument such as a piano, or some other generator of tones.

In accordance with one aspect of the invention, a method for distributing music includes the steps of sending information to identify a musical composition in writing to a customer or other person over the internet. If the customer sends a request for an audio preview of the composition that is identified in writing, a corrupted version of some or all of this musical composition is sent to the customer over the internet. If the customer then requests the musical composition without corruption, it is sent to the customer.

The corrupted version of the musical composition that is sent to the customer for purposes of identification may include a short-duration snippet of the composition or a sequence of isolated snippets from the composition, possibly with superimposed noise.

In accordance with another aspect of the invention, a musical composition can be recognized by extracting features from a specimen that has been vocalized by a person, generating a pattern from the extracted features, comparing this pattern with patterns in a pattern library, and identifying at least one musical composition as a result of this comparison. The pattern preferably includes a pitch sequence and/or a duration sequence. The pitch sequence may identify how many halftones up or down exist between a current note of the specimen and the previous note. The duration sequence may indicate the duration of one note with respect to the duration of the previous note, or the duration of features of the specimen with respect to a predetermined tempo.

DETAILED DESCRIPTION OF THE PREFERRED EMBODIMENT

Figure 1:
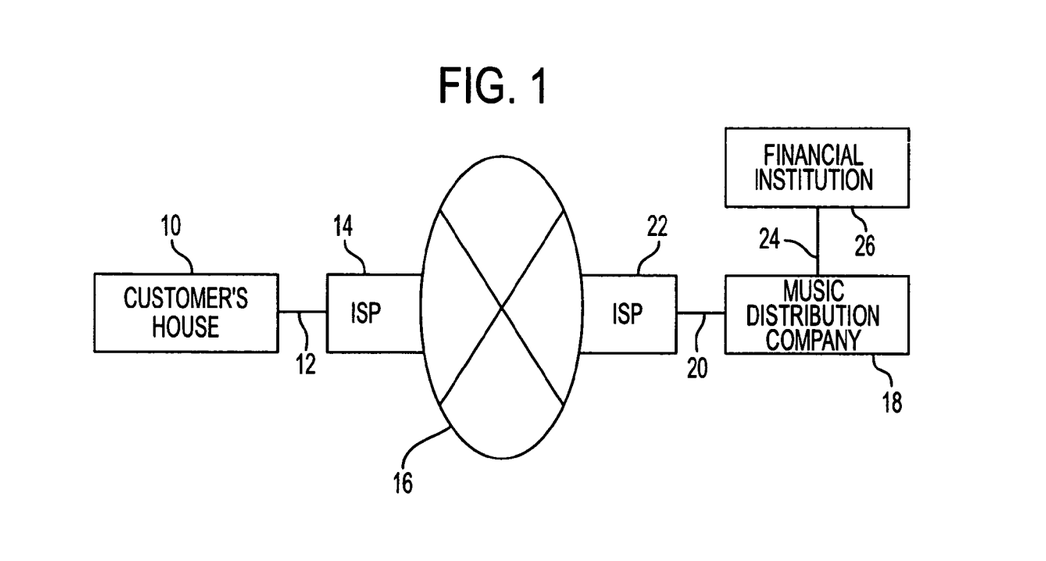
FIG. 1 schematically illustrates a system for communication between a customer and a music distribution company via the internet, along with a financial institution for facilitating payment for distributed music.

FIG. 1 illustrates a customer's house 10 which can be connected by the public telephone system, represented by a telephone line 12, to a customer's internet service provider 14. Reference number 16 represents the internet. A music distribution company 18 is connected by a high-speed data link 20 to a company's internet service provider 22, which can communicate with a customer's internet service provider 14 over the internet 16. The music distribution company 18 is also connected by a high-speed data link 24 to a financial institution 26, such as a bank that issues debit cards or credit cards or both to retail customers.

Figure 2:
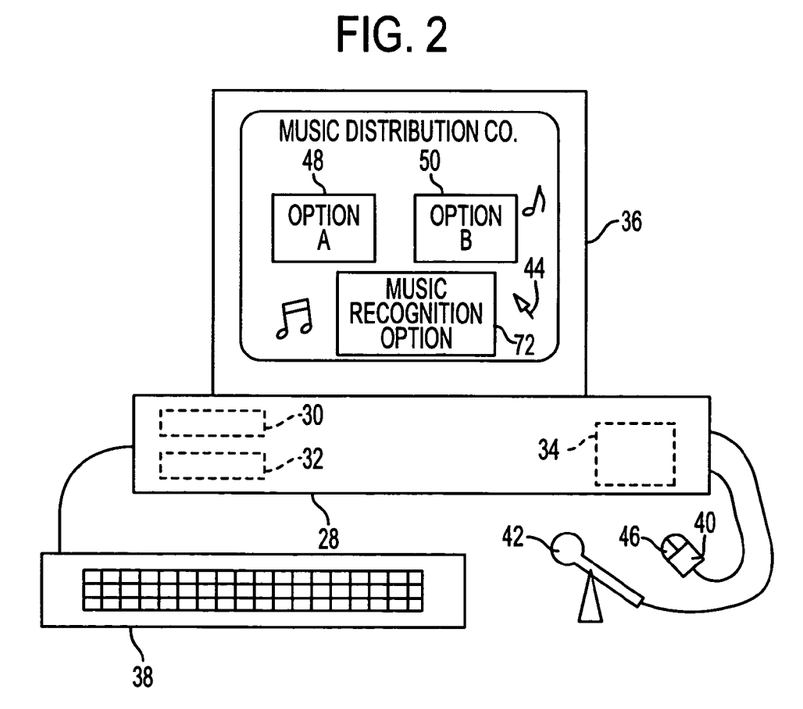
FIG. 2 illustrates equipment at the customer's location.

FIG. 2 illustrates equipment located at the customer's house 10. This equipment includes a computer 28 having a hard disk 30, a drive 32 for a removable recording medium, and a speaker 34. The computer 28 has a modem (not illustrated) for communicating with the internet service provider 14. A monitor 36 is connected to the computer 28. Also connected to the computer 28 are a keyboard 38 and a microphone 42. An audio system (not illustrated) may be connected to the computer 28. It will be assumed that the customer has installed a program which permits him to receive music files (possibly in encoded form, such as MP3-encoded files) and to store and play them.

The customer may move the mouse 40 over a surface in the usual manner to control the location of a pointer 44 on the screen of the monitor 36. The mouse 40 has a button 46 that the customer can depress to signal to the computer that the customer has selected a region of the screen of monitor 36 with the pointer 44, and wishes to commence a predetermined activity associated with the selected region of the screen (i.e., "click on" somthing). Furthermore, depending on what is displayed on the screen, the operating system employed by computer 28 (such as Microsoft's "Windows"™ operating system) may change the pointer 44 to an insertion marker (not illustrated) for identifying an insertion point for text entered via the keyboard 38.

In FIG. 2, it is assumed that the customer has employed a browser program to address a server (not illustrated) at the company 18 and to download the music distribution company's home page via the internet 16. It is also assumed that the company's home page offers customers three options for selecting songs, albums, or other musical compositions that the customer wishes to purchase. Two of these options, A and B, are illustrated schematically in regions 48 and 50 of the screen. Option A, for example, might permit the customer to select a time period (for example, within the past year, or within the past five years, or by decade intervals prior to that) and to select a type of music (rock and roll, country and western, and so forth), whereupon the music distribution company's server would return one or more pages with a menu of songs or other musical compositions available for the customer to select. For example, the customer might select 1950-1960 as the time interval, and receive an alphabetized menu of titles of rock and roll songs (along with the identity of the singer or group) that were first issued in that decade and are available for purchase from the company 18. The customer might then select the song "Blue Suede Shoes" by Elvis Presley from this menu. Option B might also permit the customer to select a time period and a type of music, and then return an alphabetized menu of singers or groups and the titles of songs that they originated during the selected period. For example, if the customer selected rock and roll and the decade 1950-1960, one singer on the menu would be Elvis Presley, and "Blue Suede Shoes" would be listed as the title of one song that he released during this period. Other menu options, including singers or groups, followed by their albums by title and the songs on each album, or key words in the lyrics, would also be possible. In each case, what would ultimately be displayed to the customer on monitor 36 for possible purchase would be a menu which identifies different pieces of music in writing (e.g., "Blue Suede Shoes" by Elvis Presley).

One problem with such an approach is that some customers have poor memories for song titles and may not remember who sang a particular song, much less be able to recall the title of the album on which it appeared. Such customers may hesitate to purchase music over the internet out of concern that they would be wasting their money if they purchased the wrong song or album. Even if steps are taken to reduce this uncertainty, as by displaying album covers or the lyrics of songs, this hesitancy would naturally have an inhibiting effect on the sale of music over the internet.

Figure 3:
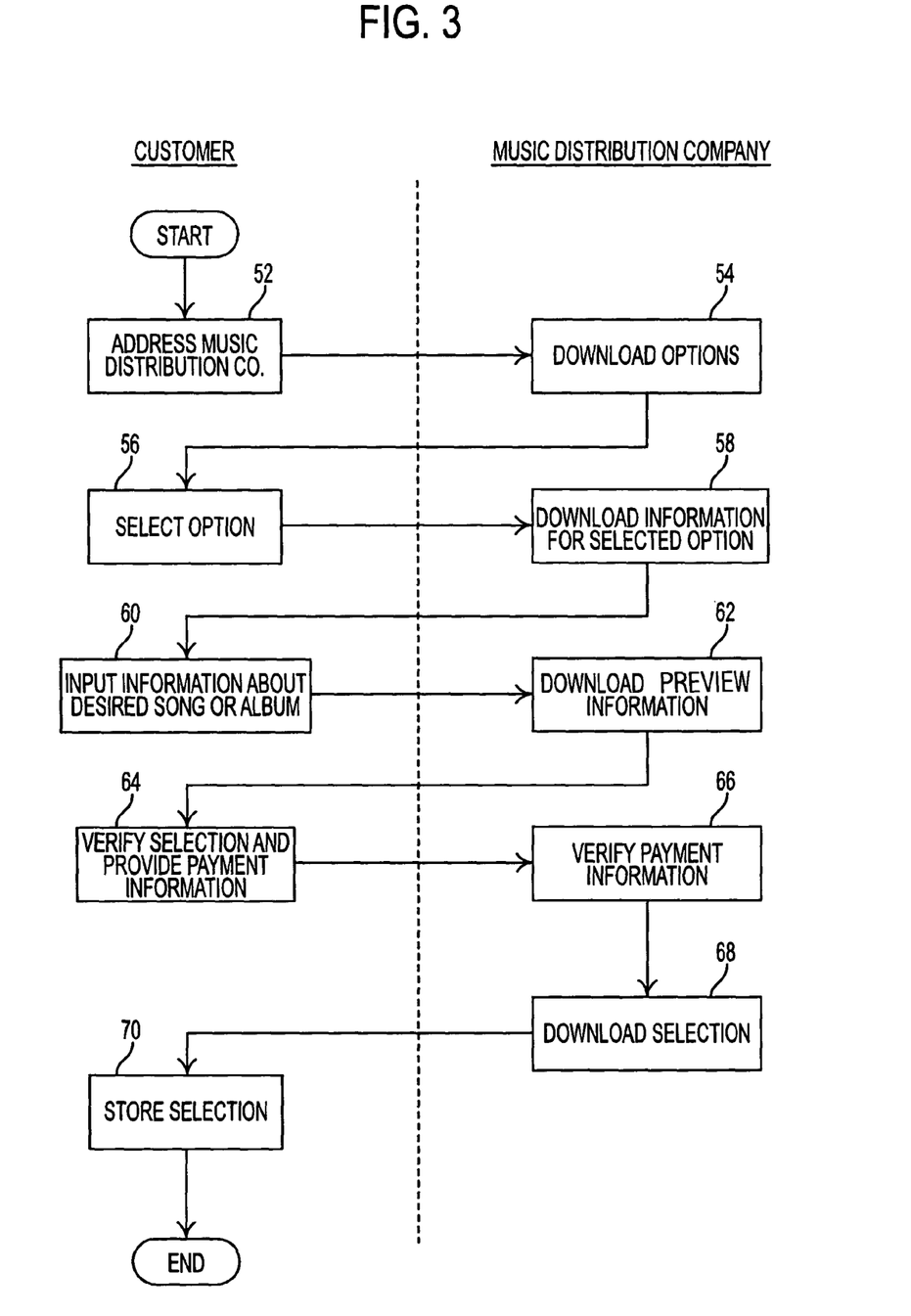
FIG. 3 is a flow chart schematically illustrating communication between the customer and the music distribution company.

FIG. 3 illustrates how to avoid this problem by permitting the customer to audibly verify that he or she has selected the piece of music that he or she intended. The customer starts by logging on with the customer's internet service provider 14 and then addressing the music distribution company (step 52) by typing in the company's worldwide web address or URL. The company thereupon downloads the selection options available to the customer (step 54). The options may be presented on the company's home page, or the home page might be hyper-linked to one or more intervening pages before the customer reaches the options. In the event that the music distribution company offers only one option, step 54 would be skipped and, instead of selecting an option in step 56, the customer would simply be presented with the option that the company supports.

In step 58, the company downloads information about the selected option. For example, if the customer has been given the option of selecting songs by title during a time period selected by the customer and for a type of music selected by the customer, an alphabetical list of titles of songs of the selected type and during the selected period, possibly also accompanied by the name of the singer or group, is downloaded in step 58. In step 60, the customer uses the selection button 46 on his mouse 40 in order to identify the desired song. This information about the desired song is conveyed to the music distribution company.

In step 62, the company downloads preview information (step 62), which permits the customer to audibly verify that the song selected in step 60 is indeed the song that the customer wants to purchase. The preview information is a corrupted version of the selected song. The corrupted version in this case is a sequence of snippets of the selected song with blank intervals between the snippets. For example, the preview information might be the first ten seconds of the song, followed by a five-second blank interval, followed by the $15^{th}$-$25^{th}$ seconds of the song, followed by another five-second blank interval, and so forth. Preferably, the snippets are also acoustically degraded. One way of doing this would be by limiting the frequency response of the snippets, but since the customer might then assume that poor quality music was being offered for sale, it might be better to superimpose noise on the snippets and possibly also on the blank intervals between the snippets. One type of noise would be a repeating ticking sound, like a metronome operating at high speed. The purpose of the preview information is to permit the customer to audibly verify the selection made at step 60 without providing the customer at this stage with music that would be enjoyable to listen to.

After the customer has listened to the preview information in step 64, he or she verifies the selection, for example, by typing "Y" on keyboard 38. Although not shown, if the customer decides after listening to the preview information that the information about the desired song that was entered at step 60 was incorrect, possibly indicated by typing "N" on keyboard 38, the procedure returns to step 60. In step 64, after verifying the selection, the customer is also asked to provide payment information, as by entering a credit card number. This information is then conveyed to the music distribution company, which verifies the payment information with the financial institution 26 (FIG. 1) during step 66. The company then downloads a file containing the selection, such as an MP3 file, in step 68. The customer then stores the downloaded file on hard disk 30 or on a removable storage medium that has been inserted in drive 32 (step 70).

Returning now to FIG. 2, in addition to the options 48 and 50, the music distribution company also offers a music recognition option that the customer can "click on" by using the mouse 40 to move the pointer 44 to the designated region of the screen of monitor 36 and then depressing the selection button 46. The music distribution company then downloads a page (not illustrated) asking the customer to vocalize the song he or she wants into the microphone 42 during an interval (for example, 10 seconds) that is communicated on the screen (as by depicting a "record" light which changes from red to green when the interval begins, and then changes back to red when the interval ends). Here, the term "vocalize" is intended to include singing lyrics, singing with the lyrics replaced by dummy vocalizations (such as "da-da-da-da"), humming, and so forth. The result of the customer's audibilization of the song that he or she wants is an audio file that is conveyed to the music distribution company 18 via the internet 16. This file will be called the "specimen" that the customer has submitted for analysis.

Figure 4:
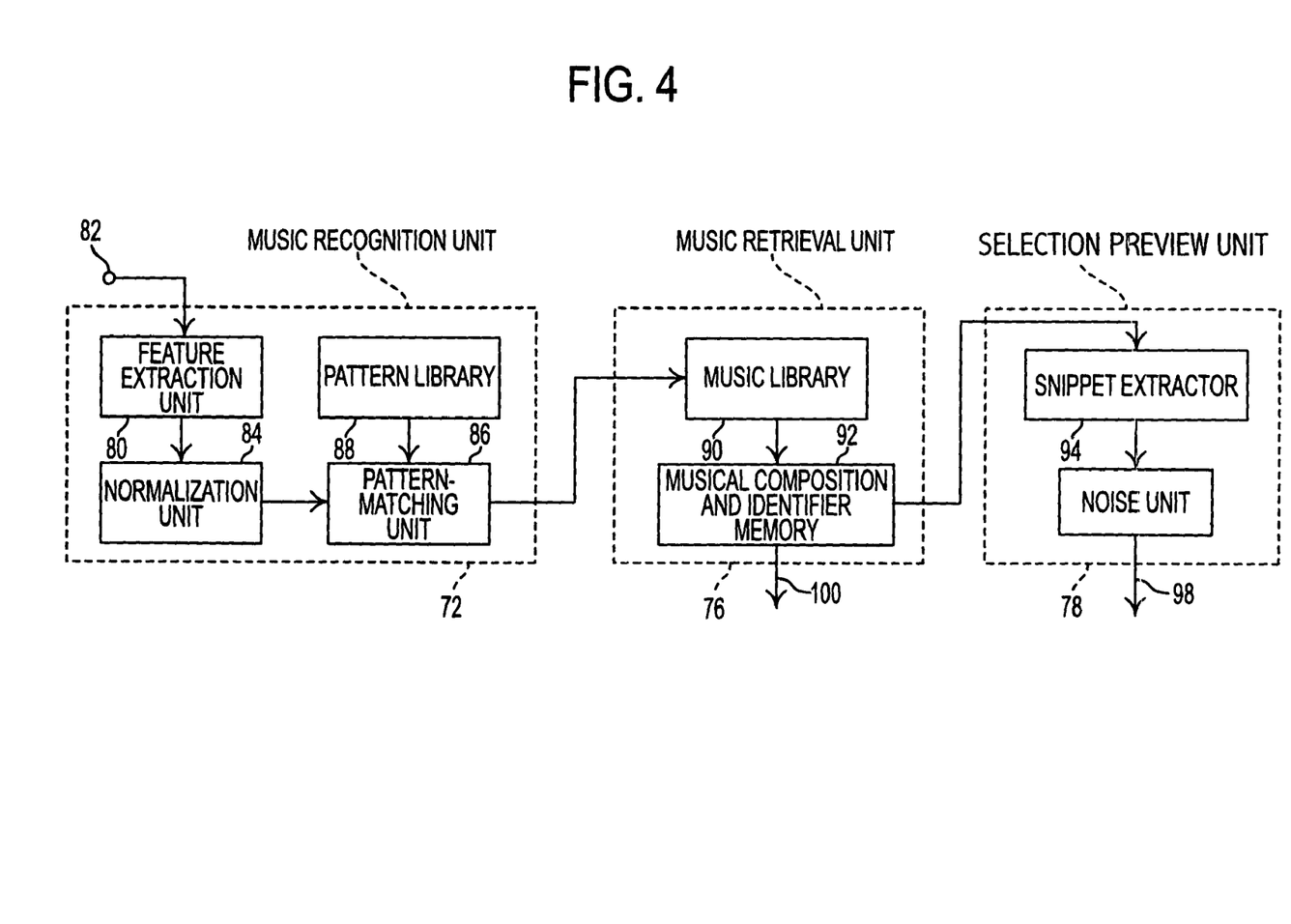
FIG. 4 is a block diagram of a system for recognizing musical compositions and providing both the compositions themselves and corrupted versions of the compositions.

FIG. 4 illustrates units located at the music distribution company 18 for analyzing the specimen. They include a music recognition unit 72, a music retrieval unit 76, and a selection preview unit 78. The music recognition unit 72 includes a feature extraction unit 80, which may include hardware components; the remaining element shown in FIG. 4 are preferably implemented by software.

The customer's specimen file is input at a port 82 and conveyed to the feature extraction unit 80. It extracts from the specimen musical features which characterize the song. The features extracted typically include information about the notes in the specimen and possibly also information about the durations of the notes. Since the customer may not vocalize the specimen in the same key as the desired recording or at the same tempo as the desired recording, the extracted features are normalized by a normalization unit 84 in order to provide frequency-independent information about the notes in the specimen and, if information about the duration of the notes is among the features extracted by unit 80, to express the durations in a relative manner that is suitable for pattern matching instead of being expressed in terms of seconds or fractions of a second. The normalized features are supplied to a pattern matching unit 86, which compares them to patterns in a pattern library 88. The pattern library 88 stores normalized features extracted from all of the songs or other musical compositions that are stored in a music library 90. The pattern library 88 may include normalized extracted features for all of each song. However, since customers will typically vocalize the chorus of a song or possibly a limited number of other memorable features, it is sufficient for the pattern library to store only normalized features for popular portions of each song. This speeds up the pattern matching.

As its name implies, the pattern matching unit 86 determines how closely the normalized features that have been extracted from the customer's specimen match the normalized features stored in the pattern library. Although it is possible for the normalized features extracted from the specimen to exactly match an entry stored in the pattern library 88, typically a distant score is calculated between the specimen and each entry in the pattern library, and a particular entry is determined to be a candidate if the distance is smaller than a predetermined value. The candidates from the reference library 88 that are selected by pattern matching unit 86 are read out of music library 90. The library 90 includes not only the encoded songs, but also identification information such as the title of the song and the name of the singer or group. The candidate songs and identifying information are stored in a musical composition and identifier memory 92.

The selection preview unit 78 includes a snippet extractor 94 that receives the contents of the memory 92. The identification information (i.e., identifiers such as title and singer or group) is downloaded at step 58 (FIG. 3) and the customer selects one of the candidates by clicking on the identification information in step 60. The snippet extractor 94 thereupon extracts a sequence of snippets from the selected candidate, with blank spaces between the snippets, and a noise unit 96 superimposes a repetitive ticking sound on the snippets and the blanks between them. This forms preview information, which is conveyed along a path 98. The preview information is downloaded at step 62 of FIG. 3. If the customer then verifies the selected candidate during step 64 and offers suitable payment, a file containing the musical composition itself is issued along a path 100 and is downloaded in step 68.

Figure 5:
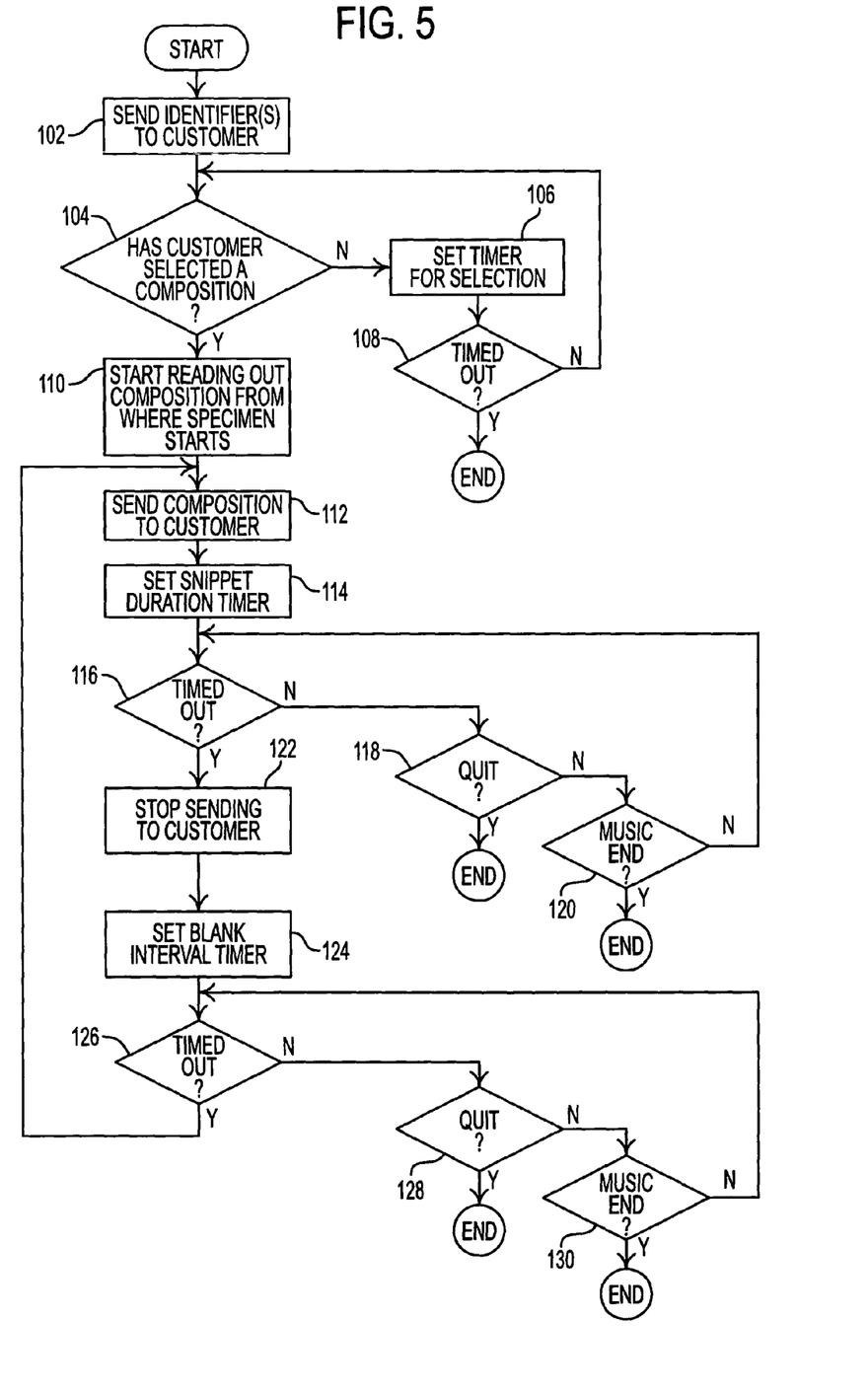
FIG. 5 is a flow chart illustrating an example of corruption of music by an extraction of snippets.

One way to implement snippet extractor 94 is illustrated in a flow chart shown in FIG. 5. It is assumed in FIG. 5 that the customer has exercised the music recognition option and that one or more compositions and one or more identifiers have been stored in memory 92 as a result of pattern matching with the customer's specimen. In step 102, the identifier or identifiers stored in memory 92 are transmitted to the customer for display on the customer's monitor. If the customer chooses a selection by clicking on it with the mouse 40, information about the selected composition is transmitted to the music distribution company. In step 104, a check is made to determine whether the customer has made a selection. If not, a selection timer is set in step 106. A check is made in step 108 to determine whether the time set by this timer has elapsed, and if not, the process returns to step 104. If the timer has timed out (Y at step 108), a notice is sent to the customer, and the snippet extraction process ends before it has truly gotten underway.

When the customer has selected a composition (Y at step 104), the file of the selected composition is read out of memory 92, beginning from where the customer's specimen started. The file is sent to the customer as it is read out in step 112. The customer begins playing the composition when he or she receives the file, and can probably tell rapidly whether the composition is the one that he or she intended in the specimen.

A snippet duration timer is set in step 114. A check is made in step 116 to determine whether it has timed out. If not, a check is made at step 118 to determine whether the customer has signaled a desire to stop listening to this composition. The customer can signal such a desire by clicking on another identifier, thereby ending the snippet extraction procedure for the composition that he or she had previously selected, or by taking some other action that is inconsistent with a desire to continue listening to the previously selected composition, as by moving to a different page of the music distribution company's web site or leaving the web site entirely. If the customer has not decided to stop listening to the selected composition, a check is made at step 120 to determine whether the selected composition has ended. If not, the process returns to step 116.

After the snippet duration timer has timed out (Y at step 116), the reading out of the file from memory 92 continues, but it is not sent to the customer (step 122). A blank interval timer is set in step 124, and a check is made at step 126 to determine whether it has timed out. If not, checks are made at steps 128 and 130 to determine whether the customer has indicated a desire to stop listening to this composition or whether the composition has ended. After the blank interval timer has timed out (Y at step 126), the process returns to step 112, and the customer then has an opportunity to begin listening to the next snippet.

The operation of snippet extractor 94 is similar to that discussed above with respect to FIG. 5 if the customer does not select the music recognition option, and instead picks a composition from a menu of identifiers displayed on the monitor 36. The main difference would be that the snippet extraction process would begin at step 110 after the file of the selected composition had been read out of the library 90 on the basis of the identifier selected by the customer, and the reading of the file from the memory 92 would start from the beginning of the composition.

Figure 6:
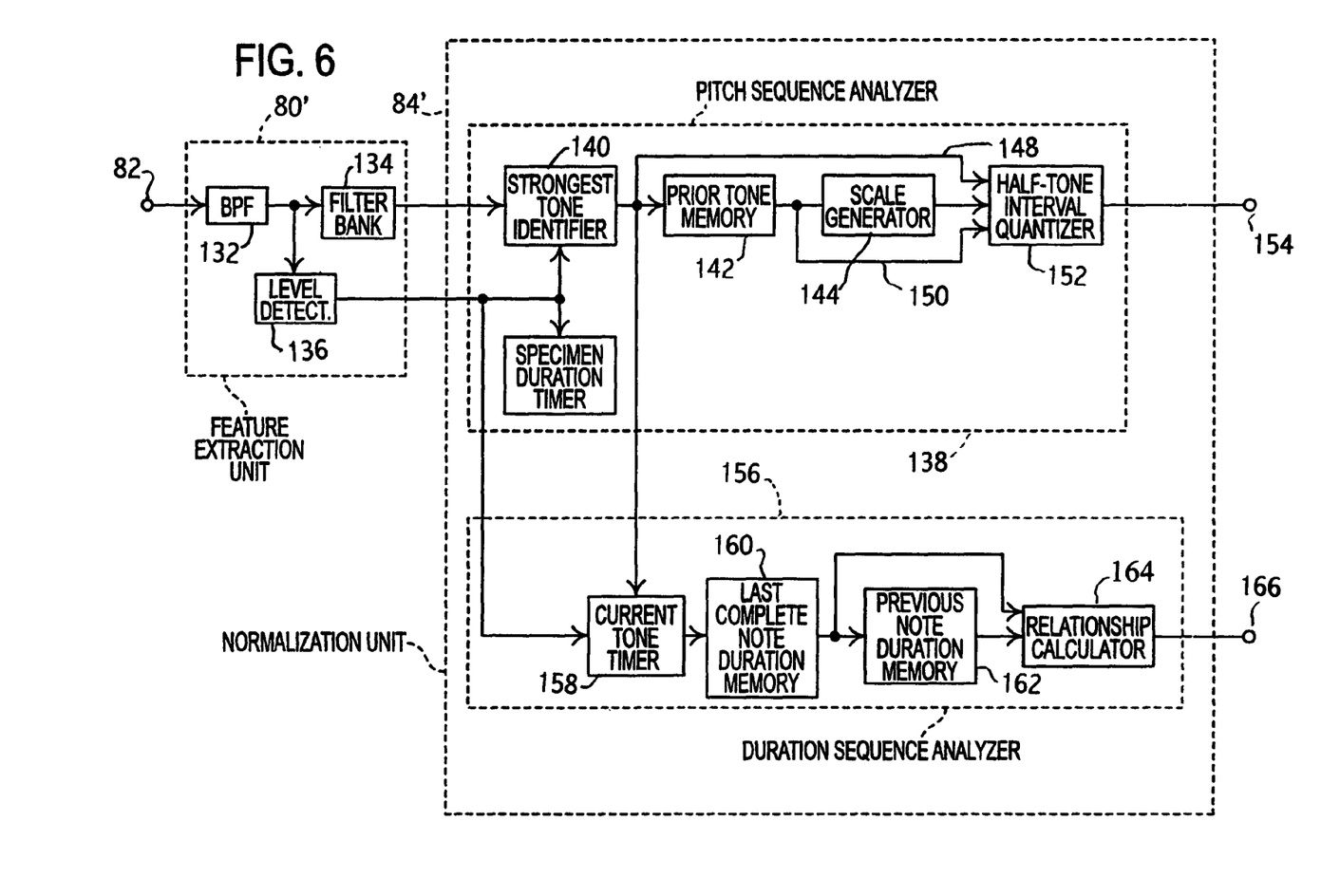
FIG. 6 is a block diagram of a feature extraction unit and a normalization unit of a music recognition system.

FIG. 6 illustrates an embodiment of two units in the recognition unit 72: a feature extraction unit 80' and a normalization unit 84'. It is assumed that the specimen file from the customer has been transformed to an analog audio signal that is applied to an input port 82. This signal is filtered by a narrow bandpass filter 132 whose passband is limited to a few octaves in which most customers can be expected to sing. The bandpass filtered signal is then supplied to a frequency analyzer such as a filter bank 134. The feature extraction unit 80' also includes a level detector 136, which compares the level of the bandpass filtered signal to a predetermined value, outputting a digital one if the level is above a predetermined value and otherwise outputting a zero.

The normalization unit 84' includes a strongest tone detector 140, which identifies the frequency of the strongest signal from filter bank 134 if the level detector 136 determines that the level of the bandpass filtered signal exceeds the predetermined value. If the frequency of the strongest signal from filter bank 134 changes, the new frequency is identified by strongest tone identifier 140 and the old one is transferred to a prior tone memory 142. In the event that the level detected by the detector 136 falls below the predetermined value, the strongest tone identifier 140 continues to identify the frequency that was strongest when the level was above the predetermined value, and no changes are made in the content of memory 140. The reason for this is that many customers can be expected to vocalize their specimen using a string of dummy words, such as "da-da-da," leaving pauses or periods of substantially reduced volume between the "das," even though the composition they are audibilizing may lack such pauses or periods of reduced volume. It is worth noting that the strongest tone identifier 140 will continue to identify a tone when the customer's audibilization accurately reflects a rest (or period of silence) in the composition itself. Although this could be looked at as an error if the purpose were to fully characterize the composition so as to be able to accurately reproduce it from the characterization alone, the purpose here is not to regenerate the music, but instead to generate a pattern for pattern matching. It is believed that ignoring periods of silence in the specimen will be beneficial since this will accommodate differences in the way that customers vocalize music (particularly when using dummy words at different frequencies with low volume or no volume between the dummy words), while ignoring rests will not substantially diminish the utility of the patterns that are produced.

The strongest tone identifier 140 preferably ignores changes in frequency that persists less than a predetermined interval of time, such as a tenth of a second. This avoids spurious results due to inadvertent warbling or pitch changes during the customer's audibilization.

Now, a brief digression into the physics of music. If one tone has twice the frequency of another tone, the two tones are said to be an octave apart. In what is called the "equally tempered scale," an octave interval is divided into 12 halftone intervals. The ratio between one interval and the next is the $12^{th}$ root of 2 (approximately 1.05946).

It is conventional to set the frequency of the A above middle C at 440 Hz. Table 1 below shows the equally tempered scale for an octave beginning at middle C (the sign # indicates a sharp):

TABLE 1

Equally Tempered Scale For A = 440 Hz

| Note | Frequency in Hz |
|------|-----------------|
| C    | 261.6 (=C# ÷ 1.05946) |
| C#   | 277.2 (=D ÷ 1.05946) |
| D    | 293.7 (=D# ÷ 1.05946) |
| D#   | 311.1 (=E ÷ 1.05946) |
| E    | 329.6 (=F ÷ 1.05946) |
| F    | 349.2 (=F# ÷ 1.05946) |
| F#   | 370.0 (=G ÷ 1.05946) |
| G    | 392.0 (=G# ÷ 1.05946) |
| G#   | 415.3 (=A ÷ 1.05946) |
| A    | 440 (defined) |
| A#   | 466.2 (=A × 1.05946) |
| B    | 493.9 (=A# × 1.05946) |
| C    | 523.2 (=B × 1.05946 or 2 × C) |

It seems unlikely that many customers for music would be able to vocalize in perfect pitch using the frequencies depicted in Table 1 (or the corresponding frequencies in octaves above or below those illustrated in Table 1). However, even if a customer vocalizes a specimen off-key, the 1.05946 ratio between halftones would remain (unless the customer is hopelessly unable to carry a tune). Table 2 below shows an octave of an equally tempered scale beginning at a frequency that is a little bit below middle C. By comparing Tables 1 and 2, it will be seen that all of the notes in Table 2 have frequencies that are slightly below those of the corresponding notes in Table 1, but are above the frequencies of the notes a half-tone below the corresponding frequencies of Table 1 (for example, "almost F sharp" in Table 2 has a frequency of 360.6 Hz, which is below true F sharp in Table 1 (370.0 Hz) but above true F in Table 1 (349.2 Hz)). It will be apparent from the above discussion of the physics of music that the exact set of frequencies that a customer uses to vocalize a specimen is relatively unimportant, so long as this set of frequencies conforms to the $12^{th}$ root of two ratio between half-tone intervals in the equally tempered scale.

TABLE 2

Equally Tempered Scale, Off-Key

| Note | Frequency in Hz |
|---|---|
| Almost C | 255 (off-key vocalization) |
| Almost C# | 270.2 (Almost C × 1.05946) |
| Almost D | 286.2 (Almost C# × 1.05946) |
| Almost D# | 303.2 (Almost D × 1.05946) |
| Almost E | 321.3 (Almost D# × 1.05946) |
| Almost F | 340.4 (Almost E × 1.05946) |
| Almost F# | 360.6 (Almost F × 1.05946) |
| Almost G | 382.1 (Almost F# × 1.05946) |
| Almost G# | 404.8 (Almost G × 1.05946) |
| Almost A | 428.8 (Almost G# × 1.05946) |
| Almost A# | 454.3 (Almost A × 1.05946) |
| Almost B | 481.4 (Almost A# × 1.05946) |
| Almost C | 510.0 (Almost B × 1.05946) |

Regardless of what frequency a customer uses for audibilizing the first note of his or her specimen, that frequency establishes a scale of relative frequencies and the second note of the specimen will have one of these relative frequencies. A scale base upon the frequency of the second note would include the same set of frequencies as the scale based upon the first note, so long as the first and second notes are an integral number of equally tempered half-tones apart. Similarly, a scale based on the third vocalized note of the specimen would include the same set of frequencies. In an analogous manner, a guitar that is in tune relative to itself can be used to play a song even if the strings of the guitar are not tuned to concert pitch, and each note of the song that is played on this guitar will fall in the same scale.

Returning now to FIG. 6, a scale generator 144 receives the content of the prior tone memory 142, and generates a scale from it by multiplying the frequency of the prior tone by integral multiples of the $12^{th}$ root of 2 and by dividing the frequency by integral multiples of the $12^{th}$ root of 2. The current tone that is being vocalized will have one of the frequencies on this scale if the customer is vocalizing his or her specimen accurately (and the frequency of the current tone will be near one of the frequencies generated by the scale generator 144 even if the customer is slightly inaccurate in his vocalization). A half-tone quantizer 152 receives the frequency of the current tone along a path 148 and the frequency of the prior tone along a path 150. It also receives the scale produced by the generator 144. The half-tone interval quantizer 152 then determines the number of half tones between the current tone and the prior tone by comparing them to the scale. If the current tone and the prior tone are adjacent to each other on the scale, then the current and prior tones are a half-tone apart. If the scale has one frequency point between the current tone and the prior tone, then they are two half-tones apart. Two frequency points on the scale between the current tone and the prior tone means that they are three half-tones apart, and so forth. The quantizer 152 indicates at an output port 154 how many halftones the current tone lies above or below the prior tone of the customer's specimen. If one considers a sequence of five different notes in the specimen, a typical sequence might be +4 (indicating that the second note of the sequence is four halftones above the first note of the sequence), −6 (indicating that the third note of the sequence is six half tones below the second note of the sequence, or two half notes below the first), −4 (indicating that the fourth note of the sequence is four half notes below the third tone of the sequence), and +8 (indicating that the fifth note of the sequence is 8 half tones above the fourth note of the sequence). The output of the pitch sequence analyzer 138 is thus a sequence of positive or negative integers which characterize the notes in the customer's specimen.

The normalization unit 84' preferably also includes a duration sequence analyzer 156. It includes a current tone timer 158 which begins timing an interval when the output of level detector 136 goes from 0 to 1 and completes the timing of the interval when the output of strongest tone identifier 140 changes. The time measured by the timer 158 is then shifted to a last complete note duration memory 160, and the current timer 158 is reset in preparation for timing a new interval. When the new interval is timed, this value is shifted to the memory 160, and the value previously stored in memory 160 is shifted to a previous note duration memory 162. A relationship calculator then calculates the relationship between the value stored in the memories 160 and 162. One way of calculating this relationship would be to determine whether the last complete note is longer, shorter, or approximately equal in duration to the previous note. This would provide a sequence at an output port 166 that is selected from a set of three states (more than a little longer, more than a little shorter, or approximately equal). A more sophisticated relationship to calculate would be the ratio of the duration of the last complete note to the duration of the previous note. Music is typically comprised of whole notes, half notes, quarter notes, eighth notes, and so forth, so ratios would be particularly useful in characterizing the specimen. One problem with ratios, however, might arise if a very brief note is followed by a much longer one (say, for example, a sixteenth note at one frequency followed by three whole notes at another frequency), in which case the ratio might become very sensitive to inadvertent inaccuracies by the customer in the duration of the shorter tone. Because of this, it may be desirable to identify the ratio simply as "large," rather than expressing it numerically, if the ratio exceeds a predetermined value (possibly 32 or 64).

There are several options for how the pitch sequence and duration sequence from normalization unit 84' may be used in pattern matching. One option would be to use the pitch sequence to identify patterns in library 88 (FIG. 4) with the same or similar pitch sequences as the specimen and if the number of "hits" is large, to then proceed to the duration sequence in order to reduce the number of candidates. Of those compositions located with the aid of the pitch sequence from pitch sequence analyzer 183, those which have duration sequences that are the same as or similar to the duration sequence from analyzer 156 would be retained. Of course, the duration sequence from analyzer 156 could be checked first, with the pitch sequence from analyzer 138 being used to locate a subset of the hits that were detected using the duration sequence. Although the normalization unit 84' has both a pitch sequence analyzer (138) and a duration sequence analyzer (156), it should be noted that a normalization unit could consist of only one of these analyzers, although on many occasions this would increase the number of hits that would need to be presented to the customer.

Another option that should be mentioned would be to use the pitch sequence and the duration sequence from analyzers 138 and 156 simultaneously during the pattern matching. This approach would be particularly fruitful when the relationship calculated by the relationship calculator 164 is a ratio. The pitch of a note in the customer's specimen and how long that note lasts with respect to the previous note of the specimen, and the pitch of the next note in the specimen and its duration with respect to the previous note of the specimen, and so forth for the rest of the specimen, would be checked against the patterns in library 88. The net result would be somewhat like creating a pitch-with-respect-to-time graph of the customer's specimen, and then comparing this graph with similar pitch-with-respect-to-time graphs stored in the pattern library 88. If the pitch of a note in the customer's specimen matches the pitch of a note in one of the patterns in the library, but the duration of the note in the customer's specimen is slightly different, the result would be a small error or distance from the pattern in the library. If the pitch of the next note in the specimen and its duration are the same as the next pitch and duration in the library's pattern, there would be no increase in the error or distance. If the pitch of the next note in the specimen matches the next pitch in the pattern, but again the duration is slightly off, this error or distance would be added to the previous error or distance, and so on, until the entire specimen has been checked against this particular pattern in the library and a total distance score has been obtained. This total distance score would then be compared to a threshold value to determine whether the specimen is relatively close to this particular pattern in the library.

The patterns stored in library 88 could be prepared by professional musicians, who listen the recordings, record the melodies using standard musical notation, and then generate pitch and duration sequences from the musical notation. A far less expensive approach would be to play the recordings and generate pitch and duration sequences for storage, using the feature extraction unit 80' and the normalization unit 84'.

Although it would be possible for pattern library 88 to store pitch and duration sequences for the entirety of each composition from beginning to end, the speed of the pattern matching could be increased considerably if the pattern library 88 only includes portions of each composition, possibly the chorus and one or two other memorable stretches of music that might tend to stick in the mind of consumers. Another possibility would be to store pitch and duration sequences for all of each composition, but to limit the pattern matching by unit 86 to only the chorus of each composition and possibly also one or two other memorable stretches of each composition. Of course, if the normalization unit that is used employs only a pitch sequence analyzer or only a duration sequence analyzer, what has been said above applies only to the respective sequence.

Figure 7:
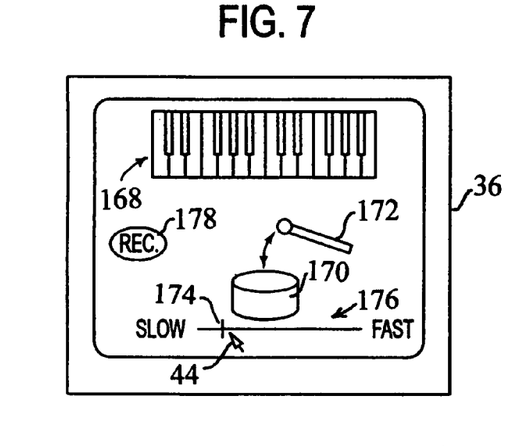
FIG. 7 illustrates a display on a monitor for permitting a customer to select a key and a tempo.

Another embodiment will now be described with reference to FIGS. 7 and 8. FIG. 7 illustrates a piano keyboard 168 that is displayed on the monitor 36. The customer positions the pointer 44 on one of the keys and then clicks the selection button 46 (FIG. 2) to hear the tone of that key at concert pitch (see Table 1). The customer may listen to other notes in the same manner until he or she finds the key in which he or she is comfortable vocalizing. The note selected will be the first note of the customer's specimen. The customer also adjusts the tempo of the vocalization. Reference number 170 illustrates a drum which is beat repeatedly by a drum stick 172, with each beat of the drumstick being accompanied by a characteristic sound from the speaker 34 (FIG. 2). The customer may adjust the tempo of the drumbeats by using the mouse 40 (FIG. 2) to move the pointer 44 so as to adjust the position of a marker 174 along a tempo scale 176 from fast or slow. After the customer has selected the pitch of the first note of the specimen using the keyboard 168 and the tempo of the specimen using the temp scale 176, he or she can practice the specimen several times and then hit a key of keyboard 38 (FIG. 2) to transmit the selected pitch and tempo to the music distribution company. A simulated "record" light 178 then changes colors, for example, from red to green, telling the customer to start vocalizing the specimen. After a predetermined period, perhaps 10 seconds, the record light 178 changes back, thus ending the specimen. The customer may, however, terminate the specimen before then by depressing a key on keyboard 38.

Figure 8:
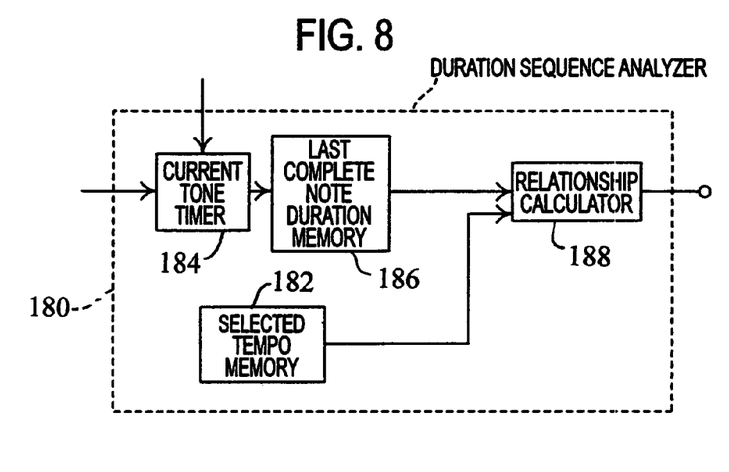
FIG. 8 illustrates an alternative arrangement for a duration sequence analyzer that is part of the normalization unit shown in FIG. 6.

FIG. 8 illustrates a duration sequence analyzer 180, which includes a selected tempo memory 182 that stores the tempo selected by the customer. It also includes a current tone timer 184, which receives input signals from the level detector 136 and the strongest tone identifier 140 (see FIG. 6). When the current tone is followed by a new tone, what was previously the current tone becomes the last complete note, and its timed duration is shifted to a last complete note duration memory 186. A relationship calculator 188 then finds the relationship between the duration of the last complete note and the tempo selected by the customer.

The embodiment of FIGS. 7 and 8 has the advantage of inviting increased participation by the customer. Furthermore, after the customer has found a frequency at concert pitch at which to begin the specimen, he or she will likely be able to keep the remaining notes of the specimen at concert pitch. This is of no particular consequence if the pitch sequence analyzer 138 that is shown in FIG. 6 is employed. On the other hand, since the customer is using concert pitch or approximately concert pitch for the specimen, it would be possible for the pitch sequence to be a sequence of notes (for example, C, E, G, A #, . . . ) which could be compared by the pattern matching unit 86 (FIG. 4) against note sequences stored in the pattern library 88.

Additionally, the relationship calculator 188 can find the ratio between the duration of each tone in the specimen and a set value that is stored in the memory 182. A duration sequence formed in such a manner would tend to be more reliable than a duration sequence form determined by taking the ratio between the duration of each note in the specimen and the duration of the previous note. It would be necessary to find the tempo of each recording in order to provide patterns for the library 88 (FIG. 4). This could be done electronically, but it could also be easily done manually by a person who listens to each recorded composition for a few measures and closes a switch on the beats.

Figure 9:
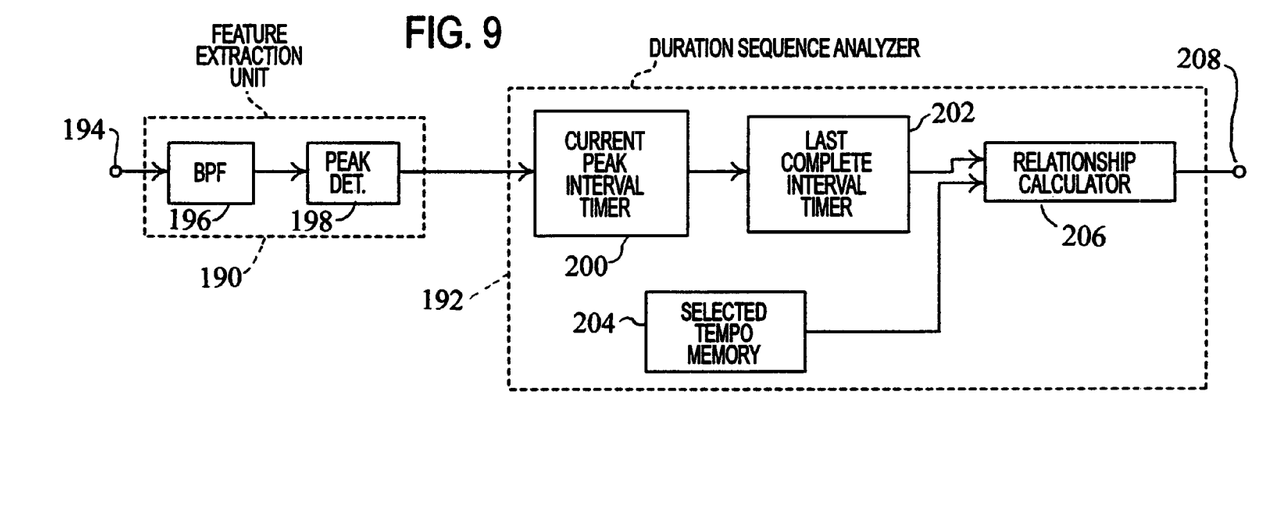
FIG. 9 illustrates a feature extraction unit and a duration sequence analyzer for rap music.

FIG. 9 illustrates an embodiment of a feature extraction unit 190 and a normalization unit 192 (a duration sequence analyzer alone) that are suitable for use with rap music, which is primarily characterized by rhythm rather than by pitch sequences. The audio signal is applied to an input port 194 and is filtered by a bandpass filter 196. Unlike the arrangement shown in FIG. 6, where the level detector 136 generates a binary output which depends on whether the bandpass-filtered signal exceeds a threshold value, in FIG. 9 the bandpass filtered signal is supplied to a peak detector 198. When it detects a peak in the volume of the bandpass-filtered signal, the output of detector 198 changes momentarily from a digital "0" to a digital "1." This signal is applied to a current peak interval timer 200, which then begins timing until the next peak is detected. The current interval then becomes the last complete interval, and the content of timer 200 is shifted to a last complete interval memory 202. The timer 200 is then reset and begins timing a new current interval.

The normalization unit 192 also includes a selected tempo memory 204 for storing a tempo selected by the customer. A relationship calculator 206 then finds the ratio between the duration of the last complete interval and the selected tempo, and provides a duration sequence at an output port 208.

In the next embodiment, which will be described with reference to FIG. 10, the customer produces the specimen not by audibilizing it, as in prior embodiments, but by picking it out on a simulated piano keyboard. The specimen that is sent to the music recognition unit can then be very simple. For example, if the customer picks out a tune that consists of the note D with a quarter note's duration, followed by the note G# with a quarter note's duration, followed by the note F with a half note's duration, and so forth, the specimen that is sent for recognition could simply be [(C, ¼), (G#, ¼), (F, ½), . . . ]. A pattern for pattern matching could then be produced based on the a sequence of pitches and durations indicated by the specimen.

Figure 10:
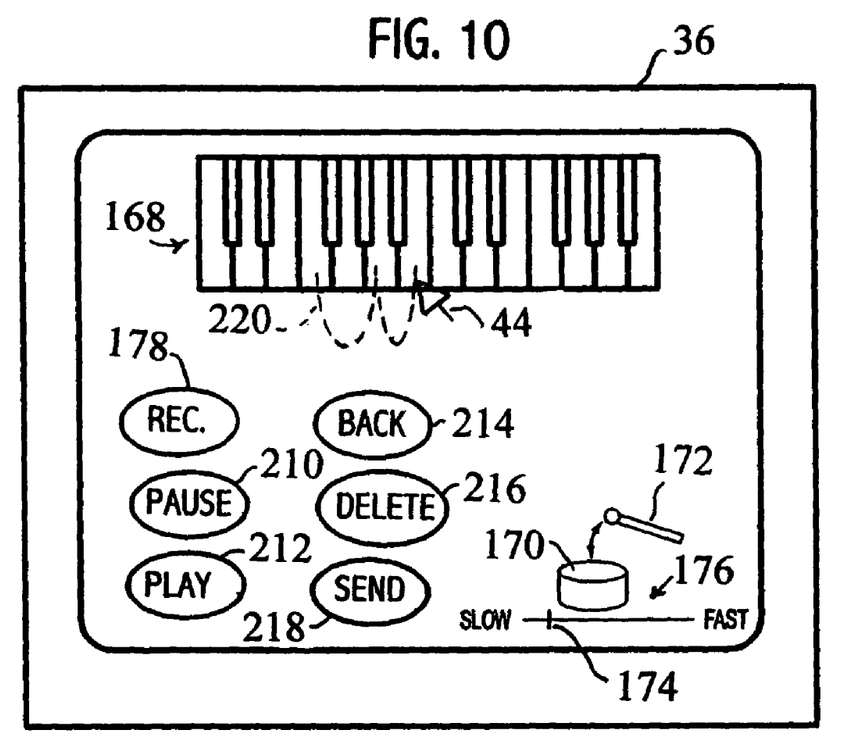
FIG. 10 illustrates a display on a monitor for permitting a customer to pick out a tune on a simulated piano using a mouse.

In FIG. 10, the monitor 36 displays the piano keyboard 168 and a metronome-like tempo setting arrangement that includes the drum 170, the drumstick 172, and the movable marker 174 on the tempo scale 176. The customer can set the tempo as in the embodiment shown in FIG. 7. In addition to the simulated record button 178, the monitor 36 in FIG. 10 displays a pause button 210, a play button 212, a back-space button 214, a delete button 216, and a send button 218 that the customer clicks on, when the customer is satisfied with the specimen, to send the specimen to the music recognition unit.

In the embodiment that was described previously with the aid of FIG. 7, the keyboard 168 was used to permit the customer to select a suitable pitch to start audibilizing the specimen. In the present embodiment, in contrast, the customer uses the mouse pointer 44 and the left mouse button 46 (see FIG. 1) to pick out a tune that is simultaneously rendered audible to the customer by the speaker 34. This picking out of the specimen is illustrated schematically in FIG. 10 by a dotted line 220. After the customer practices long enough to be able to pick out the tune accurately, the customer clicks on the record button 178 to begin storing the specimen. If the customer becomes confused or makes a mistake, the customer clicks on the pause button 210 in order to discontinue the recording. The customer can review what has been recorded by clicking on the play button 212, and can delete everything that has been recorded by clicking on the delete button 216 (which would be appropriate is the customer wants to begin recording again, from scratch). By clicking on the back-space button 214, the customer erases the last note that was recorded, leaving the earlier portion of the recording intact. The customer can click the back-space button again to erase the note that was recorded before the last note, and so on. When the recording of the specimen is completed, the customer clicks on the pause button, 210 and then the play button 212 in order to listen to the specimen and confirm that it represents the musical composition that is desired. Then the customer clicks on the send button 218 to transmit the specimen to the music distribution company 18 (see FIG. 1). A code that specifies the pitches of the notes in the picked-out sample and the durations of these notes (such as [(C, ¼), (G#, ¼), (F, ½), . . . ], mentioned above) is used as the specimen.

It will be apparent that the simulated musical instrument need not be a piano keyboard (any convenient way to permit the customer to select a sequence of musical pitches will do), and that many other variations on this technique for generating the specimen are possible. Two will be mentioned specifically. In the first variation, the left mouse button 46 (see FIG. 2) is used to click on a desired key of the keyboard 168 and the tone is heard through the speaker 34, as was described above. To record a note, the right mouse button pressed along with the left mouse button (or perhaps the right mouse button alone might be pressed). This permits the customer to record, experiment until the next desired note is located, record it, and so on. It also avoids small gaps that might otherwise arise naturally in the recording as the customer moves the mouse from key to key.

The other variation is that the customer might pick out the specimen on the keyboard 38 (see FIG. 1) instead of the simulated piano keyboard 168. It would probably be desirable for the monitor 36 to display a piano keyboard and a typewriter keyboard, and use lines to map the correspondence between the keys of the piano keyboard and the keys of the typewriter keyboard.

It will be understood that the above description of the present invention is susceptible to various modifications, changes, and adaptations, and the same are intended to be comprehended within the meaning and range of equivalents of the appended claims.

In particular, if the customer's computer has hardware for extracting features from an audibilized specimen, possibly including a digital signal processor, the music distribution company may download a program for implementing the normalization unit. In such a case, the customer need not send the specimen to the music distribution company, but can, instead, simply send patterns derived from the specimen. Furthermore, although the music recognition techniques disclosed herein are particularly useful for internet distribution of music, they can be employed at music stores or elsewhere without involvement of the internet.

What I claim is:

1. A method for distributing music over the internet, comprising the steps of:
    (a) recognizing a plurality of musical compositions from a specimen vocalized by a person, by using a computer to compare a pattern derived from the specimen with patterns from a pattern library;
    (b) sending information to identify the musical compositions in writing to the person over the internet;
    (c) receiving a request from the person over the internet for an audio preview of one of the musical compositions, which has been selected by the person;
    (d) sending a corrupted version of some or all of the selected musical composition to the person over the internet;
    (e) receiving a request from the person over the internet for the selected musical composition without corruption; and
    (f) sending the selected musical composition without the corruption to the person,
    wherein the person is provided with a set of keys to hear and choose from before vocalizing the specimen,
    wherein the pattern derived from the specimen comprises pitch information, and
    wherein deriving the pattern comprises detecting whether the specimen has a loudness level greater than a predetermined value, dividing the specimen into a plurality of frequency bands, finding a first one of the frequency bands that has the strongest signal when the loudness level of the specimen is greater than the predetermined value, detecting when the strongest signal shifts to a second one of the frequency bands if the loudness level of the specimen is greater than the predetermined value, and detecting the number of half tones between the first one of the frequency bands and the second one of the frequency bands.

2. The method of claim 1, further comprising receiving the specimen over the internet and then deriving the pattern from the specimen.

3. The method of claim 1, wherein the pattern derived from the specimen is received over the internet.

4. The method of claim 1, wherein step (f) is conducted over the internet.

5. The method of claim 1, further comprising securing payment for the musical composition without corruption before conducting step (f).

6. A method for distributing music to a person over the internet, comprising the steps of:
   (a) picking out a musical specimen on a simulated musical instrument, step (a) being conducted by the person, the specimen comprising codes to identify the notes picked out rather than sounds detected by a microphone, the codes being selected from a set having not more than about twelve codes per octave, the codes in the set identifying notes in an evenly-tempered scale;
   (b) sending the specimen over the internet to a music distribution company;
   (c) using a computer to recognize at least one candidate musical composition from the specimen, step (c) being conducted by the music distribution company;
   (d) sending information to identify the at least one candidate musical composition in writing to the person over the internet;
   (e) selecting a musical composition from the at least one candidate musical composition, step (e) being conducted by the person;
   (f) sending a request for an audio preview of the selected musical composition to the music distribution company over the internet;
   (g) sending a corrupted version of some or all of the selected musical composition to the person over the internet; and
   (h) sending the selected musical composition without corruption to the person over the internet,
   wherein step (c) comprises identifying a sequence of notes in the specimen without rests between the notes, and information about the time interval between the beginning of one note in the sequence and the beginning of the next note.

7. The method of claim 6, wherein the simulated musical instrument comprises a member selected from the group consisting of an image of a musical keyboard, an actual musical keyboard, and a manually operable alpha-numeric keyboard.

8. A method for delivering a musical composition desired by a person who does not know the title of the desired musical composition, comprising the steps of:
   (a) generating a specimen having information about at least a sequence of notes characterizing the desired musical composition, the specimen being generated by the person while the person is at a first location;
   (b) sending the specimen over a communication network to a second location that is remote from the first location;
   (c) at the second location, using a computer to identify the desired musical composition from the specimen; and
   (d) sending the desired musical composition to the person,
   wherein step (a) comprises providing a simulated musical instrument with which the person picks out the specimen,
   wherein step (b) comprises sending codes that identify notes in the specimen, the codes being selected from a set having not more than about twelve codes per octave, the codes in the set identifying notes in an evenly tempered scale, and
   wherein deriving the pattern comprises generating information identifying a sequence of notes without rests between the notes, and information about the interval between the beginning of one note in the sequence and the beginning of the next note.

9. The method of claim 8, wherein the communication network in step (b) is the internet, and wherein the desired musical composition is sent in step (d) over the internet.

10. The method of claim 8, wherein the desired musical composition that is identified in step (c) is one of a plurality of candidate compositions that are identified from the pattern derived from the specimen, and further comprising identifying the candidate compositions to the person, the desired composition being selected by the person from among the candidate compositions.

11. The method of claim 8, wherein the specimen additionally includes information about the duration of the notes in the sequence.

12. The method of claim 1, wherein the specimen further comprises duration information.

13. The method of claim 1, wherein the person is additionally provided with a user-adjustable tempo for vocalizing the specimen.

14. A method for distributing music over the internet, comprising the steps of:
   (a) recognizing a plurality of musical compositions from a specimen vocalized by a person, by using a computer to compare a pattern derived from the specimen with patterns from a pattern library;
   (b) sending information to identify the musical compositions in writing to the person over the internet;
   (c) receiving a request from the person over the internet for an audio preview of one of the musical compositions, which has been selected by the person;
   (d) sending a corrupted version of some or all of the selected musical composition to the person over the internet; (e) receiving a request from the person over the internet for the selected musical composition without corruption; and
   (f) sending the selected musical composition without the corruption to the person,
   wherein the person is provided with a set of keys to hear and choose from before vocalizing the specimen,
   wherein the pattern derived from the specimen comprises pitch information, and
   wherein deriving the pattern comprises generating information identifying a sequence of notes in the specimen without rests between the notes, and information about the time interval between the beginning of one note in the sequence and the beginning of the next note.

15. The method of claim 8, further comprising displaying the simulated musical instrument on a monitor that additionally displays a plurality of options for use by the person, the options including a record option, a play option, a back-up option, and a send option, the simulated musical instrument and the options being actuated by the person using a pointing device.

16. A method for delivering a musical composition desired by a person who does not know the title of the desired musical composition, comprising the steps of:
   (a) generating a specimen having information characterizing the desired musical composition, the specimen being generated by the person while the person is at a first location using an apparatus configured for sending and receiving information via a communication network, the apparatus including a keyboard and an audio transducer for producing sounds, keys of the keyboard being assigned notes of a musical scale and the notes being sounded by the transducer when the keys are manually actuated by the person;
   (b) sending the specimen over the communication network to a second location that is remote from the first location;
   (c) at the second location, using a computer to identify the desired musical composition from the specimen; and
   (d) sending the desired musical composition to the person, wherein the person generates the specimen by actuating a sequence of keys while listening to the notes sounded by the transducer, and wherein step (c) comprises identifying a sequence of notes in the specimen without rests between the notes, and information about the time interval between the beginning of one note in the sequence and the beginning of the next note.

17. The method of claim 16, wherein the apparatus additionally has a screen, and further comprising displaying on the screen a mapping that associates notes of the scale with keys of the keyboard.

18. The method of claim 16, wherein step (b) comprises sending codes that identify notes in the specimen rather than the sounds of the notes themselves.

* * * * *